United States Patent [19]

Klocek et al.

[11] Patent Number: 5,629,074

[45] Date of Patent: May 13, 1997

[54] DURABLE POLYMERIC OPTICAL SYSTEMS

[75] Inventors: Paul Klocek, Dallas; Patrick A. Trotta, Plano, both of Tex.

[73] Assignee: Texas Instruments Incorporated, Dallas, Tex.

[21] Appl. No.: 289,404

[22] Filed: Aug. 12, 1994

[51] Int. Cl.[6] .......................... B32B 7/02; B32B 17/00; G02B 13/14
[52] U.S. Cl. .......................... 428/212; 428/913; 156/99; 156/102; 156/209; 156/219; 264/1.1; 264/1.7; 264/257; 264/293; 359/356
[58] Field of Search .......................... 428/34, 13, 212, 428/14, 74, 113, 224, 245, 45, 38, 288, 289, 290, 292, 480, 500, 913; 156/99, 102, 209, 219; 359/356; 250/338.1, 515.1; 264/1.1, 1.7, 167, 257, 293

[56] References Cited

U.S. PATENT DOCUMENTS

| | | | |
|---|---|---|---|
| 3,687,764 | 8/1972 | Rogosch et al. | 156/179 |
| 4,412,255 | 10/1983 | Kuhlman et al. | 174/35 MS |
| 4,670,347 | 6/1987 | Lasik et al. | 428/458 |
| 4,788,088 | 11/1988 | Kuhl | 428/192 |

*Primary Examiner*—Donald Loney
*Attorney, Agent, or Firm*—Richard A. Stoltz; James C. Kesterson; Richard L. Donaldson

[57] ABSTRACT

A polymeric infrared window (10) is described which comprises a sheet of polymeric material (14). Sheet 14 further may comprise a layer of molecular weave polymer material (34) fixed to a electromagnetic interference shield (32). In addition, a polymeric sheet (42) may be embossed with a binary defractive pattern (40) to create a polymeric defractive lens (38).

34 Claims, 1 Drawing Sheet

5,629,074

DURABLE POLYMERIC OPTICAL SYSTEMS

RELATED APPLICATIONS

This application is related to U.S. Pat. No. 5,324,586, filed Sep. 2, 1992, entitled *Polymeric Infrared Optical Protective Coating* of Paul Klocek, et al. and U.S. patent application Ser. No. 08/241,218, filed May 11, 1994, of Paul Klocek, et al. entitled *High-Strength, High-Modulus Continuous Polymeric Material for Durable, Impact-Resistant Applications,* the contents of both of which are hereby incorporated by reference as if fully set forth herein.

TECHNICAL FIELD OF THE INVENTION

This invention relates in general to the field of electro-optic systems and more particularly to systems utilizing durable polymeric materials to form optical systems.

BACKGROUND OF THE INVENTION

Electro-optic sensor systems use a window or dome to separate sensitive internal mechanisms from ambient conditions. In high-speed operations, impact of soft and hard particles such as rain, sand, hail, dust, etc. can degrade the optical transmission capabilities of the window or dome. As such, some past efforts have concentrated on developing protective coatings for the windows or domes. In general, the coatings must exhibit high fracture-toughness or strength with a high elastic modulus to reduce the strain induced in the coated substrate or a low elastic modulus to absorb the impact stress.

Certain polymers, copolymers, and terpolymers have proved to be highly effective coatings while still providing for high optic transmission in the infrared wavelength region, particularly the 8–12 micrometer region. The polymers, copolymers, and terpolymers that exhibit high transparency in the 8–12 micrometer wavelength range are, by way of example and not limitation, polyethylene, ethylene-octene copolymer, polyvinylpyrrolidone, poly(acenaphthylene), styrene/ethylene-butylene copolymer, poly(1-butene), poly(acrylic acid, ammonium salt), polyamide resin, ethylene/propylene copolymer and ethylene/propylene/diene terpolymer. Each of these materials is effective as particle impact and erosion resistant coatings for infrared transmissive windows and domes.

The polymers, copolymers, and terpolymers mentioned previously have also been strengthened greatly by using these materials to form a molecular weave polymeric material as described in U.S. patent application Ser. No. 08/241,218 entitled *High-Strength, High-Modulus Continuous Polymeric Material for Durable Impact-Resistant Applications,* the disclosure of which has been previously incorporated herein by reference. As described in this reference, the polymeric material can be greatly strengthened by weaving fibers of the material into a woven matrix and then heating the polymeric fabric to create a consolidated molecular weave polymeric material.

Although the polymeric materials have been used successfully as coatings for electro-optical windows and domes, the electro-optic systems still exhibit a very high cost due to the cost of the substrates coated by the polymeric materials.

SUMMARY OF THE INVENTION

Accordingly, a need has arisen for an optical device which exhibits the strength and durability of the polymeric coatings and does not require expensive substrate materials.

In accordance with the teachings of the present invention, a durable polymeric optical device is provided which substantially reduces disadvantages associated with prior solutions. According to one embodiment of the present invention, an optical window is provided that comprises an edge supported or metal grid supported sheet of polymeric material which comprises a fabric of polymeric fibers and a matrix of polymeric material disposed in the interstices between the fibers which exhibit a lower melting temperature than the polymeric fibers. The sheet of polymeric material may alternatively comprise a fabric of polymeric material fibers consolidated into a continuous sheet without an additional matrix polymer.

BRIEF DESCRIPTION OF THE DRAWINGS

A more complete understanding of the advantages of the present invention may be acquired by referring to the accompanying figures in which like reference numbers indicate like features and wherein.

DETAILED DESCRIPTION OF THE INVENTION

Figure 1A:
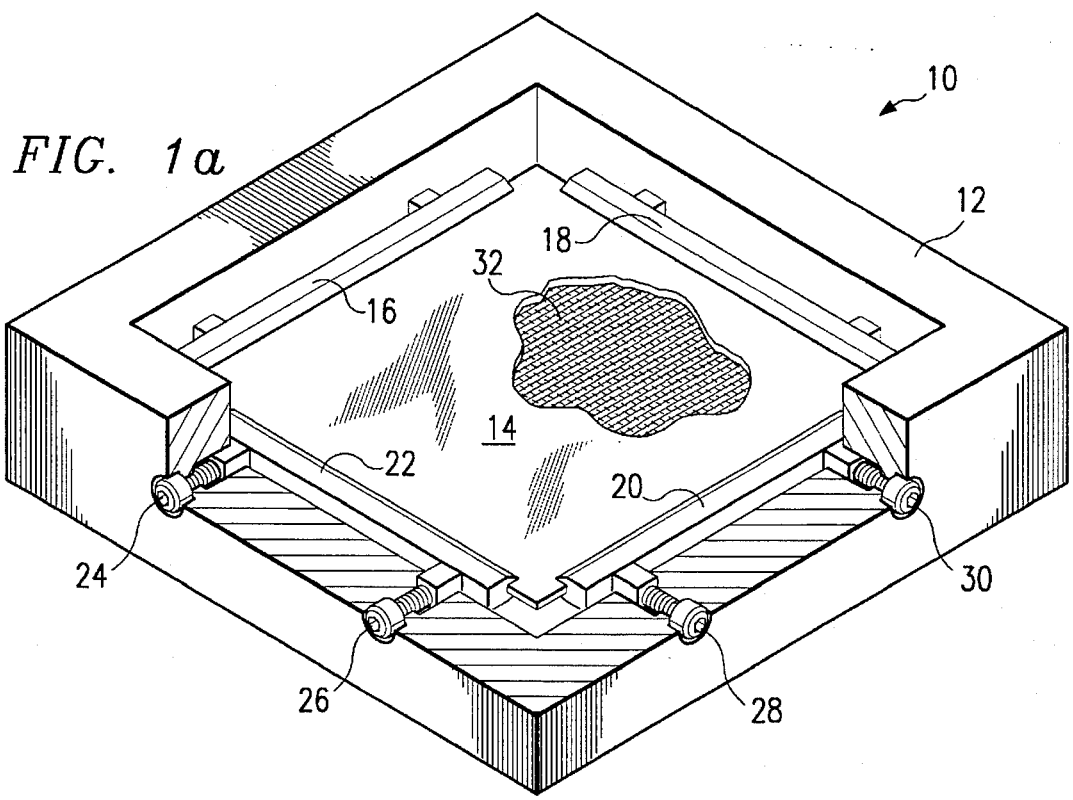
FIG. 1a is an elevational diagram illustrating a polymeric optical device constructed according to the teachings of the present invention.

FIG. 1a illustrates a polymeric optical window 10 which comprises a frame 12 that supports a sheet 14. Sheet 14 comprises a polymeric molecular weave material which provides infrared transmissivity in the infrared wavelength range of, for example, 8–12 micrometers. Sheet 14 is not a polymeric coating but is rather a free-standing sheet of polymeric material on the order of 4 to 5 mils thick. Sheet 14 is held in place by clamps 16, 18, 20 and 22. Sheet 14 is kept taut by increasing the tension on clamps 16, 18, 20 and 22 by tightening screws which are connected to the clamps such as, for example, screws 24 and 26 coupled to clamp 22 and screws 28 and 30 coupled to clamp 20. Similar screws are also coupled to clamps 16 and 18.

Sheet 14 comprises in part a polymeric material which comprises a molecular weave such as the material described in U.S. patent application Ser. No. 08/241,218 entitled *High-Strength, High-Modulus Continuous Polymeric Material for Durable Impact-Resistant Applications.* This material provides for over 80% transmission of infrared radiation in the 8–12 micrometer range. The material also provides for a high elastic modulus, high strength, and durability such that the material may be used as an infrared window to protect other portions of an infrared sensing system. In this manner, sheet 14 is the final element of the electro-optic system which separates the internal optical systems from the outside ambient environment. Sheet 14 may be impacted by a variety of soft and hard particles at extremely high speeds. These particles may comprise rain, dust, or sand, depending upon the particular application of the electro-optical sensing system. Infrared windows are common in electro-optic sensing systems for aircraft, missiles, and automobiles. In each of these applications, environmental concerns are paramount. The electro-optics must be protected from the outside environment. The polymeric molecular weave material comprising sheet 14 is extremely inexpensive when compared to the combinations of crystalline substrates with polymeric coatings that have been used in previous systems.

The sheet 14 may comprise a fabric of polymeric fibers and a matrix of polymeric material disposed in the interstices between the fibers where the melting temperature of the matrix of polymeric material is lower than the melting temperature of the polymeric fibers. According to this embodiment, the polymeric fibers forming the polymeric material are thermoplastic and have a strength of at least about 0.1 GPa (14,000 psi) and an elastic (Young's) modulus of at least about 1 GPa ($1.4 \times 10^5$ psi) and the matrix of polymeric material has an elastic modulus in the range from about $1 \times 10^4$ psi to about $1.3 \times 10^5$ psi. The sheet 14 may alternatively comprise a fabric of polymeric fibers consolidated into a continuous sheet without an additional matrix polymer.

Sheet 14 may be used alone or, as shown in FIG. 1a, in combination with an electromagnetic interference shield 32, shown in part in FIG. 1a.

Figure 1B:
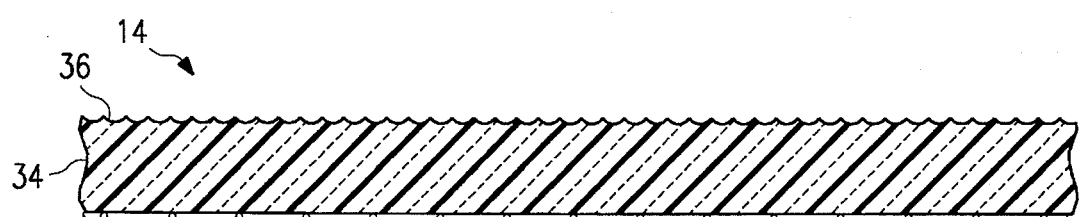
FIG. 1b is a cross-sectional elevational diagram showing the construction of a polymeric optical window constructed according to the teachings of the present invention.

Electromagnetic interference shield 32 may comprise a wire screen that may comprise a variety of conductive materials such as aluminum, copper, or gold. Shield 32 may be coupled to ground potential either directly or by coupling shield 32 to frame 12 and then coupling frame 12 to ground potential if frame 12 is constructed of a suitable conductive material. Shield 32 comprises spaces between the wires and wire sizes such that shield 32 will couple to RF radiation and shield the electro-optic system disposed behind electro-optic window 10 from 35 electromagnetic radiation in the RF range. The coupling capability of shield 32 is determined by the ratio of the period of the lines forming screen 32 to the width of the lines. This ratio should be on the order of 10 to provide for efficient RF coupling and infrared transmission. The size of the wire and the spacing of the wire forming screen 32 can be adjusted to provide for a ratio on the order of 10 without blocking an inordinate amount of the infrared radiation that is needed by the electro-optic sensors behind screen 32 and window 10. FIG. 1b is a cross-sectional diagram of the construction of one embodiment of sheet 14. As shown in FIG. 1b, sheet 14 can comprise electromagnetic interference shield 32 adjacent to a layer of the polymeric molecular weave material 34. In addition, an anti-reflective sub-wavelength structure 36 can be embossed into the outer surface of sheet 14 to increase the degree of infrared transmission of sheet 14. Using such anti-reflective structures, the infrared transmissivity of sheet 14 can be increased on the order of 10%. It should be understood that the structure 36 shown in FIG. 1b is not to scale and is shown greatly enlarged for purposes of teaching the present invention.

Shield 32 may be disposed on either face of sheet 14. In addition, shield 32 may be formed integral with the molecular weave material in layer 34. Further, the malleable nature of the molecular weave material in layer 34 makes bonding layer 34 to shield 32 a relatively simple and very efficient process. Layer 34 can be adhered to shield 32 using epoxies, adhesives or shield 32 can be embedded into layer 34 by hot pressing them together.

Figure 2:
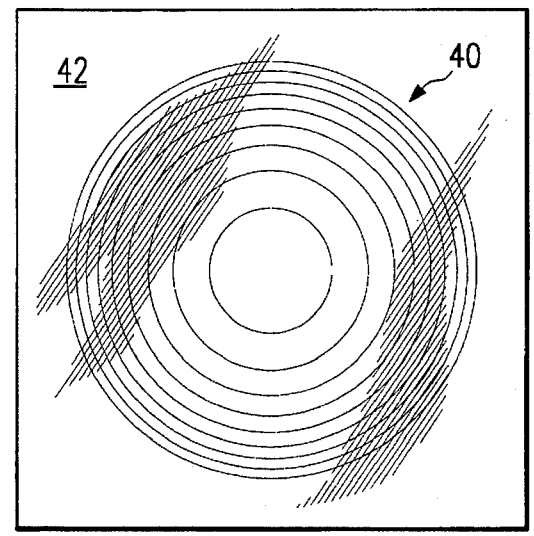
FIG. 2 is a diagram illustrating a polymeric diffractive lens constructed according to the teachings of the present invention.

As described previously, the durable polymeric material may be used as a free-standing window due to its high strength and ability to transmit infrared radiation. These capabilities also lend themselves to making infrared optics using the polymeric material. FIG. 2 is an illustration of a diffractive lens, indicated generally at 38, which is formed by embossing a binary diffractive pattern of concentric rings 40 into a sheet 42 of the polymeric molecular weave material. The diffractive pattern 40 is embossed into sheet 42 by first forming a mold. The mold may be formed by using a conventional diamond lathe to turn the opposite of the binary diffractive pattern into a suitable material, such as an aluminum block. The binary diffractive pattern is on the order of 1 to 2 mils in depth and is embossed into the sheet 42 by raising the temperature of the sheet 42 to on the order of 140°–150° C. and placing the partially melted sheet 42 in contact with the mold that includes the opposite of the binary diffractive pattern. The sheet 42 is then rapidly cooled to less than 100° C. to fix the binary diffractive pattern 40 in order to form the diffractive lens 38. The pattern does not distort during cooling because of the high elastic modulus of the polymeric material forming sheet 42. In this manner, virtually any binary diffractive pattern can be embossed into the polymeric material to provide for the focusing of infrared radiation for any focal length.

The teachings of the various embodiments described herein may be combined to create an infrared window that also includes a diffractive binary pattern embossed on one of the surfaces of the window. In addition, an electromagnetic interference shield such as shield 32 may be combined with such a diffractive window to provide for electromagnetic shielding. According to this embodiment of the present invention, the window protecting the electro-optic system from the environment can also be used as an optically active portion of the electro-optical infrared sensor system to focus infrared radiation passing through the window to a particular point some distance from the window. Also, as discussed previously, anti-reflective structures can be applied to the outer surfaces of such a diffractive window to further increase the infrared transmissivity of the diffractive window.

Although the present invention has been described in detail, it should be understood that various changes, alterations, and substitutions may be made to the embodiments described herein without departing from the spirit and scope of the present invention, which is solely defined by the appended claims.

What is claimed is:

1. An infrared optical device comprising:
   an infrared optical window, wherein said window comprises a sheet of polymeric material comprising a fabric of polymeric fibers and a matrix of polymeric material disposed in the interstices between the fibers, the matrix of polymeric material having a lower melting temperature than the polymeric fibers; and
   a frame coupled to the sheet of polymeric material and defining an opening through the frame spanned by the sheet of polymeric material, the frame operable to maintain the sheet of polymeric material in a taut state across the opening, the sheet of polymeric material substantially transmissive to infrared radiation passing through the opening.

2. The optical device of claim 1 and further comprising an electromagnetic interference shield disposed adjacent the sheet of polymeric material and also spanning the opening in the frame, the electromagnetic interference shield electrically coupled to ground potential.

3. The optical device of claim 2 wherein the electromagnetic interference shield comprises a screen of conductive material operable to couple to electromagnetic RF radiation.

4. The optical device of claim 1 wherein the polymeric fibers forming the polymeric material are thermoplastic and have a strength of at least about 0.1 GPa (14,000 psi) and an elastic (Young's) modulus of at least about 1 GPa ($1.4 \times 10^5$ psi) and wherein the matrix of polymeric material has an elastic modulus in the range from about $1 \times 10^4$ psi to about $1.3 \times 10^5$ psi.

5. The optical device of claim 1 wherein the polymeric fibers forming the polymeric material comprise a material selected from the group consisting of gel spun polyethylene, polypropylene, nylon, polyvinylalcohol, and polyethylene terephthalate.

6. The optical device of claim 1 wherein the matrix of polymeric material comprises a material selected from the group consisting of polyethylene, ethylene octene copolymer, polyvinylpyrrolidone, poly(acenaphthylene), styrene/ethylene butylene copolymer, poly(1 butene), poly (acrylic acid, ammonium salt), polyamide resin, ethylene/propylene copolymer and ethylene/propylene/diene terpolymer.

7. The optical device of claim 1 wherein the polymeric material is transmissive in the 8–12 micrometer wavelength range.

8. The optical device of claim 1 wherein the sheet of polymeric material comprises an outer surface and further comprises an anti reflective structure disposed on the outer surface of the sheet of polymeric material.

9. An infrared optical device comprising:
an infrared optical window, wherein said window comprises a sheet of polymeric material comprising a fabric of polymeric fibers consolidated into a continuous sheet of polymeric material; and
a frame coupled to the sheet of polymeric material and defining an opening through the frame spanned by the sheet of polymeric material, the frame operable to maintain the sheet of polymeric material in a taut state across the opening, the sheet of polymeric material substantially transmissive to infrared radiation passing through the opening.

10. The optical device of claim 9 and further comprising an electromagnetic interference shield disposed adjacent the sheet of polymeric material and also spanning the opening in the frame, the electromagnetic interference shield electrically coupled to ground potential.

11. The optical device of claim 10 wherein the electromagnetic interference shield comprises a screen of conductive material operable to couple to electromagnetic RF radiation.

12. The optical device of claim 9 wherein the polymeric fibers forming the polymeric material are thermoplastic and have a strength of at least about 0.1 GPa (14,000 psi) and an elastic (Young's) modulus of at least about 1 GPa ($1.4 \times 10^5$ psi).

13. The optical device of claim 9 wherein the polymeric fibers forming the polymeric material comprise a material selected from the group consisting of gel spun polyethylene, polypropylene, nylon, polyvinylalcohol, and polyethylene terephthalate.

14. The optical device of claim 9 wherein the sheet of polymeric material is transmissive in the 8–12 micrometer wavelength range.

15. The optical device of claim 9 wherein the sheet of polymeric materials comprises an outer surface and further comprises an anti reflective structure disposed on the outer surface of the sheet of polymeric material.

16. An infrared optical device comprising:
an infrared lens, wherein said lens comprises a sheet of polymeric material comprising a fabric of polymeric fibers and a matrix of polymeric material disposed in the interstices between the fibers, the matrix of polymeric material having a lower melting point than the polymeric fibers;
the sheet having first and second substantially parallel outer surfaces; and
a diffractive pattern embossed on the first outer surface of the sheet of polymeric material such that the sheet of polymeric material functions as a diffractive lens focusing radiation passing through the sheet.

17. The optical device of claim 16 wherein the polymeric fibers forming the polymeric material are thermoplastic and have a strength of at least about 0.1 GPa (14,000 psi) and an elastic (Young's) modulus of at least about 1 GPa ($1.4 \times 10^5$ psi) and wherein the matrix of polymeric material has an elastic modulus in the range from about $1 \times 10^4$ psi to about $1.3 \times 10^5$ psi.

18. The optical device of claim 16 wherein the polymeric fibers forming the polymeric material comprise a material selected from the group consisting of gel spun polyethylene, polypropylene, nylon, polyvinylalcohol, and polyethylene terephthalate.

19. The optical device of claim 16 wherein the matrix of polymeric material comprises a material selected from the group consisting of polyethylene, ethylene-octene copolymer, polyvinylpyrrolidone, poly(acenaphthylene), styrene/ethylene-butylene copolymer, poly(1-butene), poly (acrylic acid, ammonium salt), polyamide resin, ethylene/propylene copolymer and ethylene/propylene/diene terpolymer.

20. The optical device of claim 16 wherein the sheet of polymeric material is transmissive in the 8–12 micrometer wavelength range.

21. The optical device of claim 16 wherein the sheet of polymeric materials further comprises an anti reflective structure disposed on at least one of the outer surfaces of the sheet of polymeric material.

22. An infrared optical device comprising:
an infrared lens, wherein said lens comprises a sheet of polymeric material comprising a fabric of polymeric fibers consolidated into a continuous sheet of polymeric material;
the sheet having two substantially parallel outer surfaces; and
a diffractive pattern embossed on one of the outer surfaces of the sheet of polymeric material such that the sheet of polymeric material functions as a diffractive lens focusing radiation passing through the sheet.

23. The optical device of claim 22 wherein the polymeric fibers forming the polymeric material are thermoplastic and have a strength of at least about 0.1 GPa (14,000 psi) and an elastic (Young's) modulus of at least about 1 GPa ($1.4 \times 10^5$ psi).

24. The optical device of claim 22 wherein the polymeric fibers forming the polymeric material comprise a material selected from the group consisting of gel spun polyethylene, polypropylene, nylon, polyvinylalcohol, and polyethylene terephthalate.

25. The optical device of claim 22 wherein the sheet of polymeric material is transmissive in the 8–12 micrometer wavelength range.

26. The optical device of claim 22 and further comprising an anti-reflective structure disposed on at least one of the outer surfaces of the sheet of polymeric material.

27. A method of manufacturing an infrared optical device comprising the steps of:
forming an infrared optical window, wherein the forming comprises
forming a sheet of polymeric material comprising a fabric of polymeric fibers and a matrix of polymeric material disposed in the interstices between the fibers, the matrix of polymeric material having a lower melting temperature than the polymeric fibers, the sheet of polymeric material substantially transmissive to infrared radiation passing through the opening;

providing a frame, wherein the frame defines an opening; and coupling the sheet of polymeric material to the frame such that the sheet of polymeric material spans the opening and the frame operates to maintain the sheet of polymeric material in a taut state across the opening.

28. The method of claim 27 and further comprising the step of embossing a diffractive pattern in a surface of the sheet of polymeric material.

29. The method of claim 27 and further comprising the step of forming an anti-reflective structure on a surface of the sheet of polymeric material.

30. The method of claim 27 and further comprising the step of fixing a screen of conductive material to one outer surface of the sheet of polymeric material.

31. A method of manufacturing an infrared optical device comprising the steps of:

forming an infrared optical window, wherein the forming comprises forming a sheet of polymeric material comprising a fabric of polymeric fibers consolidated into a continuous sheet of polymeric material, the sheet of polymeric material substantially transmissive to infrared radiation passing through the opening;

providing a frame, wherein the frame defines an opening; and coupling the sheet of polymeric material to the frame such that the sheet of polymeric material spans the opening and the frame operates to maintain the sheet of polymeric material in a taut state across the opening.

32. The method of claim 31 and further comprising the step of embossing a diffractive pattern in a surface of the sheet of polymeric material.

33. The method of claim 31 and further comprising the step of forming an anti-reflective structure on a surface of the sheet of polymeric material.

34. The method of claim 31 and further comprising the step of fixing a screen of conductive material to one outer surface of the sheet of polymeric material.

* * * * *